United States Patent [19]

Sick

[11] 4,196,962
[45] Apr. 8, 1980

[54] LIGHT CONDUCTING RODS WITH LINEAR CONVEX MIRROR ARRAYS

[75] Inventor: Erwin Sick, Icking, Fed. Rep. of Germany

[73] Assignee: Erwin Sick Gesellschaft mit beschrankter Haftung Optik-Elektronik, Waldkirch, Fed. Rep. of Germany

[21] Appl. No.: 859,782

[22] Filed: Dec. 12, 1977

[30] Foreign Application Priority Data

Jan. 3, 1977 [DE] Fed. Rep. of Germany ....... 2700027

[51] Int. Cl.² .................................................. G02B 5/14
[52] U.S. Cl. ............................ 350/96.10; 350/96.15; 350/299
[58] Field of Search ................ 350/96.10, 96.15, 96.17, 350/96.19, 96.29, 96.30, 299; 250/227

[56] References Cited

U.S. PATENT DOCUMENTS

| 3,244,075 | 4/1966 | Richards et al. | 350/96.15 |
| 3,487,223 | 12/1969 | St. John | 350/96.10 X |
| 3,728,548 | 4/1973 | Pinior | 350/96.10 X |
| 3,758,197 | 9/1973 | Klang et al. | 350/96.10 X |
| 3,860,814 | 1/1975 | Klang et al. | 250/227 |
| 4,085,322 | 4/1978 | Sick | 350/299 X |

FOREIGN PATENT DOCUMENTS 1235021 2/1967 Fed. Rep. of Germany ........ 350/96.10
2508366 9/1976 Fed. Rep. of Germany .

OTHER PUBLICATIONS

Jueneman, "Diffusing Mirror-Total Internal Reflection Illuminator", *IBM Tech. Discl. Bull.*, vol. 8, No. 1, June 1965, pp. 106–107.

*Primary Examiner*—F. L. Evans
*Assistant Examiner*—John D. Lee
*Attorney, Agent, or Firm*—Townsend and Townsend

[57] ABSTRACT

A light conducting rod in which light incident on the surface of the rod is conducted along the rod to its end faces for subsequent detection. The light entering the rod is incident on three neighboring linear arrays of individual mirrors formed along the diametrically opposite surface of the rod; each individual mirror is inclined towards the axis of the rod and cylindrically curved so that the light is reflected back onto the internal surface of the rod at an angle which ensures total internal reflection.

9 Claims, 3 Drawing Figures

LIGHT CONDUCTING RODS WITH LINEAR CONVEX MIRROR ARRAYS

The present invention relates to a light conducting rod and has particular reference to a light conducting rod having a stepped mirror arrangement in the region of the surface of the rod which runs along the length of the rod and the individual mirrors of which, as seen in a central lengthwise section, are straight and inclined to the axis of the rod so that a light ray from the diametrically opposite surface of the rod falling on the individual mirrors is reflected at such an angle that it iminges on the opposite wall at an angle which ensures total internal reflection.

A light conducting rod of this kind is already known from German Offenlegungschrift 25 08 366 in which practically all the light which enters the rod is turned by the stepped mirror through angles which ensure total internal reflection so that a very high percentage of the light falling on the surface of the rod reaches the end faces of the light conducting rod after one or more total internal reflections at the surface of the rod. At the end faces there is then disposed a photo electric converter which generates an electrical signal corresponding to the quantity of light received.

Such light conducting rods are for example used in so called line scanners in which a sharply defined ray of light, such as a laser beam, periodically scans the surface of a travelling band of material in order to discover faults or anomalies in the band. The transmitted, reflected or diffused reflected light after concentration by a cylindrical lens, is received on the surface of the light conducting rod and focussed onto the stepped mirror arrangements.

The light conducting rod preferably has a circular section but can also be of quadrilateral or rectangular section. Other cross-sections such as elliptical are also conceivable.

The stepped mirror arrangement can take the form of individual mirrors disposed together like a series of roofs which produces a symmetrical reflection to both ends of the light conducting rod. This arrangement is preferred when a photo electric convertor is provided at both ends of the light conducting rod. Other arrangements also exist, for example saw tooth arrangements which preferentially reflect the light in only one of the two directions of the light conducting rod. This arrangement is useful when a photo electric converter is provided only at one end of the light conducting rod.

A problem with such light conducting rods is however that the light reflected at the individual mirrors is generally reflected back onto the stepped mirror arrangement after a single total reflection at the opposite surface. This second reflection on the stepped mirror then no longer occurs at an optimal angle for the further transmission of the light along the rod. A further disadvantage is that a relatively sharply defined light beam is hardly dispersed or fanned out so that it arrives still in a relatively sharply defined beam at the end face of the light conducting rod where the photo electric converter is connected.

Such convertors however frequently have a variable sensitivity over their input surface so that it is desirable that the light entering the light conducting rod should reach the end face of the rod as strongly dispersed as possible.

The present invention seeks to provide a light conducting rod of the aforementioned kind in which the unwanted disturbing influence of the stepped mirror arrangement is largely eliminated and light falling on the light conducting rod in sharply defined beams is strongly dispersed and fanned out before it reaches the end face of the light conducting rod.

According to the present invention there is provided a light conducting rod comprising a linear array of mirrors extending along the rod in the vicinity of the surface of the rod the individual mirrors of the array facing towards the axis of the rod and being inclined thereto for receiving light incident on the rod surface opposite to the array and for reflecting it back to the opposing surface of the rod so that at least a major portion of the light impinges on said opposing surface at an angle at which total internal reflection occurs, the individual mirrors being flat as seeen in an axial section taken through the middle of the array and of convex curvature as seen in a section transverse to the axis of the rod.

In this way, as seen from the inside of the light conducting rod, inclined convex cylindrical mirrors are present which in accordance with their degree of curvature strongly disperse or fan out the incident practically parallel light beam so that only a fraction of the dispersed light suceeds in being further reflected at the stepped mirror arrangement after undergoing total reflection at the inner wall of the light conducting rod, the disturbing influences of a further reflection are thus avoided. A further advantage is that the strong dispersion of the light at the end face of the light conducting rod results in a very strongly smoothed i.e. homogenous light beam so that the disadvantageous effects otherwise caused by too strongly directed light leaving the end face are largely removed.

The individual mirrors are preferably of circular curvature which has advantages especially during manufacture.

The aperture ratio of the small cylindrical mirrors at the deepest position is usefully between 1:10 and 1:1 and is preferably between 1:2 and 1:6.

In order to realise the necessary curvature for optimal dispersion and simultaneously to maintain a relatively wide mirror surface and accordingly to be able to accept a desired mal alignment of the ray, a further advantageous embodiment is provided in which from 2 to 5 and preferably 3 stepped mirror arrangements are disposed alongside each other, usefully the various tracks are positioned alongside each other without clearances therebetween.

Because, with this arrangement, the transition of the incident light ray from one individual mirror to the next, which is relatively inclined, gives rise to a step in the reflection a further especially preferred embodiment is envisaged in which the individual neighbouring stepped mirror arrangements are displaced relative to one another in the direction of the axis of the light conducting rod by an amount less than a period of repetition of the individual mirrors of the arrangement. Preferably the displacement increases continuously so that the displacement of one stepped mirror arrangement relative to the preceeding is the same as from the first stepped mirror arrangement to the second.

The relevant step in the reflection occurs in the present case only in one of the multiple tracks which further assists the intended smoothing of the light beam.

The light conducting rod is preferably manufactured in a transparent synthetic material whereby the stepped mirror arrangement is achieved by means of milling with a diamond cut at an angle.

An embodiment of the invention will now be described by way of example only and with reference to the accompanying drawings in which.

Figure 1:
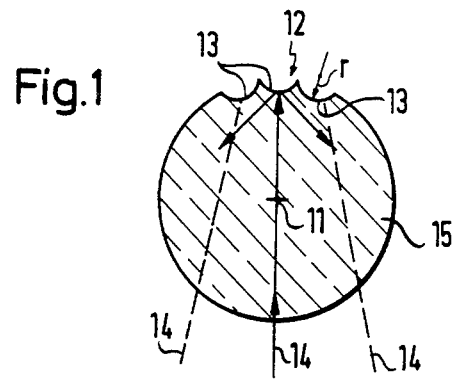
FIG. 1 shows a section at right angles to the axis of a light conducting rod.
Figure 2:
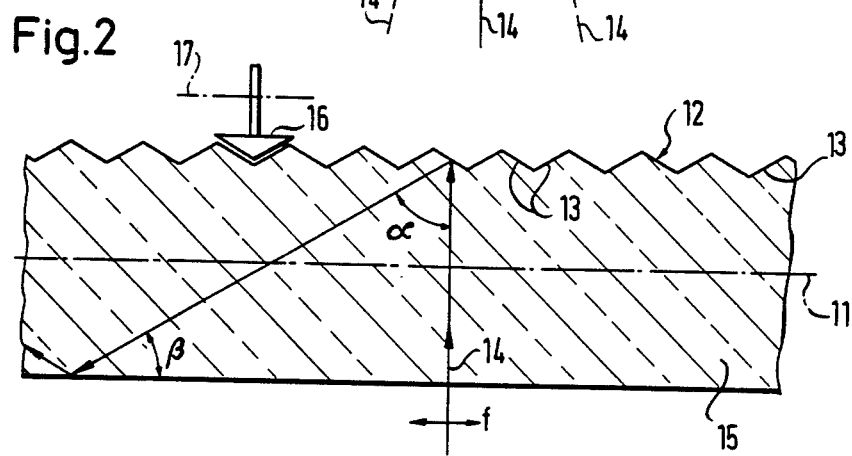
FIG. 2 is a central longitudinal section through the light conducting rod of FIG. 1.

Referring now to FIGS. 1 and 2 there is shown a sharply defined light ray 14, in this case a laser beam, which enters a light conducting rod 15 generally at right angles to its axis. The light ray 14 typically executes a continual periodic scanning movement over the external surface of the light conducting rod in the direction of the double arrow f. The ray 14 can alternatively be received on the light conducting rod 15 as a light beam concentrated by a cylindrical lens. This is illustrated by the dotted lines also referenced 14 of FIG. 1.

The light ray or beam 14 falls via the inside of the light conducting rod onto the stepped mirror arrangement 12 which comprises a plurality of individual mirrors 13 arranged together in 3 linear arrays parallel to the axis of the light conducting rod on the surface of the rod opposite to the surface through which the light ray 14 enters the rod.

In the section shown in FIG. 2 the individual mirrors 13 are straight and are inclined at an angle to the axis of the light conducting rod such that light entering the light conducting rod from the opposite side is reflected back into the interior of the rod at an angle so that it strikes the internal surface of the rod at an angle at which it is totally reflected. In this manner practically all the light entering into the light conducting rod is conducted to the end face of the rod where a photo electric converter (not shown) is arranged. One of the end faces can be made reflecting so that light falling on that end face is reflected back to the opposite end face.

The individual mirrors 13 shown in FIG. 1 face the axis of the rod and are of convex shape. The radius of curvature 'r' is relatively small so that a pronounced curvature is present. The radius of curvature is typically 6 mm corresponding to a focal length of 3 mm.

Because of the pronounced convex curvature the light illustrated in FIG. 1 falling at right angles onto the individual mirror 13 is fanned out or dispersed in all directions as shown by the arrows. Nevertheless the light reflected at the mirrors will still impinge on the wall of the light conducting rod at an angle $\beta$ (FIG. 2) which ensures total internal reflection. On account of the strong dispersion only a fraction of the totally reflected light will once more impinge on the stepped mirror arrangement 12.

Figure 3:
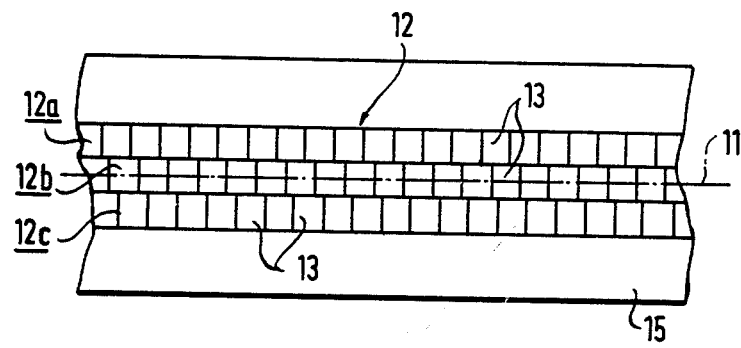
FIG. 3 is a plan view of the light conducting rod of FIGS. 1 and 2.

As seen in FIGS. 1 and 3 three stepped mirror arrangements 12a, 12b, 12c are disposed alongside one another along the surface of the light conducting rod. This brings the advantage that a relatively wide mirror surface can be achieved despite the more pronounced curvatures of the individual mirrors which tolerates a certain amount of defocussing or mal adjustment of the incident relatively feeble light beam i.e. if mal alignment of the light sideways relative to the optical axis is present the neighbouring stepped mirror takes over the dispersion of the light beam without the direction of dispersion changing impermissably. The evenness of the dispersion increases as the number of individual linear arrays of mirrors increases.

From FIG. 3 it can further be seen that with three neighbouring linear arrays of mirrors each is displaced relative to the previous one by an amount equal to ⅓ of the distance in which the individual mirrors 13 repeat.

This measure serves to produce a further smoothing or homogenising of the light which reaches the end face of the light conducting rod.

A transparent synthetic material, in this case Plexiglass is used for the manufacture of the light conducting rod and the desired mirror profile is milled into the surface of the rod by an angled diamond. Such a tool is illustrated purely schematically at 16 in FIG. 2 which illustrates the axis 17 about which the tool rotates in order to mill the necessary shape for the mirror.

While the three linear arrays 12a, 12b, 12c described in this example is the preferred number of arrays it will be understood a single array is useful and that the number of arrays can be conveniently increased up to 5 with advantage.

The representation of FIG. 12 is purely schematical, i.e. the flanks of the mirrors 13 which should be seen are not shown. Furthermore, the movement of the tool 16 must have also a linear component to obtain the form of the mirrors shown in FIGS. 1 and 3.

I claim:

1. A light conducting rod comprising a linear array of mirrors extending along the rod in the vicinity of the surface of the rod, the individual mirrors of the array facing towards the axis of the rod and being inclined thereto for receiving light incident on the rod surface opposite to the array and for reflecting it back to the opposing surface of the rod so that at least a major portion of the light impinges on said opposing surface at an angle at which total internal reflection occurs, the individual mirrors being flat as seen in an axial section taken through the middle of the array and having a convex curvature as seen in a section transverse to the axis of the rod.

2. A light conducting rod according to claim 1 wherein the curvature of the individual mirrors is a circular curvature defining generally cylindrically shaped mirrors.

3. A light conducting rod according to claim 1 in which the aperture ratio of the cylindrically shaped mirrors lies in the range between 1:10 and 1:1.

4. A light conducting rod according to claim 3 in which the aperture ratio of the cylindrically shaped mirrors lies in the range between 1:6 and 1:2.

5. A light conducting rod according to claim 1 in which a number of linear arrays of mirrors are arranged alongside one another, said number lying in the range 2 to 5.

6. A light conducting rod according to claim 5 in which 3 linear arrays are disposed alongside each other.

7. A light conducting rod according to claim 5 wherein adjacent linear arrays of mirrors lie alongside one another and are contiguous.

8. A light conducting rod according to claim 5 in which the individual linear arrays of mirrors are displaced relative to one another by an amount less than the repetition length of the individual mirrors of the arrays.

9. A light conducting rod according to claim 1 in which the material and the individual mirrors are formed by milling with an angled diamond cutter.

\* \* \* \* \*